US006480557B1

United States Patent
Rog et al.

(10) Patent No.: US 6,480,557 B1
(45) Date of Patent: Nov. 12, 2002

(54) PORTABLE GPS-RECEIVER FOR A PERSONAL SAFETY SYSTEM

(75) Inventors: Andrey Leonidovich Rog, Moscow (RU); Vladimir Nikolaevich Ivanov, Saint-Petersburg (RU); Boris Dmitrievich Fedotov, Saint-Petersburg (RU); Viktor Ivanovich Malashin, Saint-Petersburg (RU); Denis Georgievich Poverennyi, Saint-Petersburg (RU); Serguey Borisovich Pisarev, Saint-Petersburg (RU); Boris Valentinovich Shebshaevich, Saint-Petersburg (RU); Mikhail Jurievich Silin, Moscow (RU)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/763,028
(22) PCT Filed: Jun. 17, 1999
(86) PCT No.: PCT/RU99/00202
§ 371 (c)(1),
(2), (4) Date: Sep. 26, 2001
(87) PCT Pub. No.: WO01/09634
PCT Pub. Date: Feb. 8, 2001

(51) Int. Cl.$^7$ .............................................. H04B 1/10
(52) U.S. Cl. ...................................................... 375/349
(58) Field of Search .................................. 375/142, 150, 375/347, 349, 343, 316; 342/357.12; 701/215; 455/13.2, 12.1, 132

(56) References Cited

U.S. PATENT DOCUMENTS 5,615,236 A * 3/1997 Turney ........................ 375/365
5,678,169 A * 10/1997 Turney ............................ 455/1
5,757,916 A * 5/1998 MacDoran et al. ............ 380/25
6,298,083 B1 * 10/2001 Westcott et al. ....... 342/357.12
6,300,899 B1 * 10/2001 King ..................... 342/357.05
6,314,366 B1 * 11/2001 Farmakis et al. ........... 340/961

* cited by examiner

Primary Examiner—Chi Pham
Assistant Examiner—Emmanuel Bayard
(74) Attorney, Agent, or Firm—Sughrue Mion, PLLC

(57) ABSTRACT

The portable GPS-receiver for a system of personal safety having such attributes, as diminished power consumption, overall dimensions and weight, because the input unit contains the multichannel digital correlator with N=by 8 to 12 channels of parallel processing connected with the microprocessor equipped with permanent storage unit for storage of the programs of signal processing and operative storage for data storage by activity in a standard mode without interlock of GPS signals, thus the microprocessor of the output unit is connected by trunks of a data exchange to the former of clock signals and heterodyne frequencies of an input unit, with an input-output unit of the data, with the transceiver unit and in addition provided with the permanent storage unit for storage of the programs of signal processing and operative storage for data storage and samples of the multichannel digital correlator for operation in conditions of interlock of GPS signals, and each of N of channels of the multichannel digital correlator is equipped with K inphase and Ko quadrature correlators, where K=20 to 40, connected with the appropriate storage units ensuring a capability of a simultaneous correlation of GPS signals with K copies of C/A code, shifted on half of digit of C/A GPS code, and coherent accumulation of results of a correlation on an interval equal to duration of epoch of C/A code.

2 Claims, 6 Drawing Sheets

PORTABLE GPS-RECEIVER FOR A PERSONAL SAFETY SYSTEM

FIELD OF THE INVENTION

The invention relates to the field of a radio navigation, and, more specifically, to technical systems of personal safety, which allow the position-fix based on signals of a satellite radio navigational system "GPS" and message passing about position along with the messages of an emergency situation to a base monitoring station.

DESCRIPTION OF THE RELATED ART

The systems of personal safety, considered here, are versions of systems of tracking of objects used in monitoring (tracking) or control. The development of this branch—the branch dealing with the observation of location of people, is justified by a prospect of development of receivers of GPS signals with such overall dimensions, weight and power consumption, that would allow construction of probable GPS receivers with personal means of mobile radio communication. Thus the task of minimization of overall dimensions, reduction of power consumption and simplification of receivers executing a position-fix on GPS signals, is one of most important.

The systems of tracking of objects, for example of vehicles (see application of Germany (DE) 3501035, Int. Cl. G08 G 1/00, publ. Jul. 17, 1986 [1], application EPO (EP) 0379198, Int. Cl. G01 S 5/02, G01 S 5/14, 30 publ. Jul. 25, 1990 [2], application EPO (EP) 0509775, Int. Cl. G01 S 5/14, publ. Apr. 15, 1992 [3]and patent of USA U.S. Pat. No. 5,319,374, Int. Cl. G01 S 1/24, G01 S 5/02, G01 S 3/02, G04 C 11/02, publ. Jun. 7, 1994 [4]), are known, in which the tracked object—a vehicle—is supplied with the unit for a position-fix on GPS signals and equipment for radio communication with a central station, which carries out monitoring of the position of transport.

The systems are known, which track vehicles on GPS signals and, in case of an extreme situation, transmit the data about position to a tracking station (see, for example, application of Germany (DE) 3839959, Int. Cl. G08 B 25/00, G08 G 1/123, B60 Q 9/00, H04 Q 7/00, publ. Apr. 12, 1990 [5], patent of USA U.S. Pat. No. 5,355,140, Int. Cl. G01 S 1/08, G01 S 5/02, publ. Oct. 11, 1994 [6] and application PCT (WO) 93/16452, Int. Cl. G08 G 1/123, publ. Aug. 19, 1993 [7]).

In the considered systems of tracking and scheduling of vehicles [1–7] for a position-fix the standard receivers of GPS signals, equipped by additional units ensuring data transmission about site, and also alarm signals of a radio channel on station of tracking are used. As a rule, in such systems the receivers of GPS signals are not supposed to perform with strict requirements to minimization of the equipment and the power saving, and the tasks of a position-fix in conditions of partial blocking of a signal reception GPS are overcome, for example, by an integration with elements of inertial systems.

In contrast to systems for tracking transport, in systems of personal safety to receivers of GPS signals, operating for a position-fix, additional requirements can exist. On the one hand, it is justified by the necessity of accommodation of the receiver of GPS signals in a body of a radiophone (see, for example, Application EPO (EP) 0528090, Int. Cl. G01 S 5/00, publ. Feb. 24, 1993 [8]. This results in necessity to minimize means of receiving GPS signals and their power consumption. On the other hand, the requirements may be specified on provision of a position-fix in conditions of partial blockage of GPS signals, for example in operation conditions "under foliage", using thus only radio signals received from the air.

The receiver of GPS signals with communication channel for message passing about extreme situations (see application PCT (WO) 97/14057, Int. Cl. G01 S 5/14, G01 S 1/04, publ. Apr. 17, 1997) [9], is known in which the additional means ensuring a capability of a position-fix on GPS signals in conditions of their partial blockage are provided. The receiver described in [9], is selected as the prototype. The generalized skeleton diagram of the receiver adopted as the prototype, is shown on FIG. 1.

The receiver—prototype, see FIG. 1, contains an input unit 1 of conventional receiver of GPS signals, including sequentially connected radio frequency signal converter 2, whose input is also an input of the unit 1, and unit 3 for analog-to-digital conversions of signals, whose output is also an output of the unit 1, and also former 4 of signals of clock and heterodyne frequencies, whose control and reference inputs are control and reference inputs of the unit 1, respectively; whereby heterodyne input of the radio frequency signal converter 2 and clock input of the unit 3 are connected respectively to heterodyne and clock outputs of the former 4. The former 4 is supplied with means for formation of signal clock and heterodyne frequencies including, for example, synthesizers of frequencies, the pre-set inputs of which form a control input of the former 4. The synthesizers of frequencies work from the reference generator which is included in a structure of the former 4. In a case, where in the receiver the tuning of frequency of the reference generator by an external high-stable signal is provided, the reference generator is supplied with the appropriate tuning unit, for example unit PLLF, whose reference input forms a synchronization input (i.e., reference input) of former 4.

The receiver—prototype contains also output unit 5 of the conventional receiver of GPS signals, whose signal input is connected to an output of the unit 3 via the switch 6, and whose clock input is connected to a clock output of the former 4.

To the second output of the switch 6 are connected sequentially joint memory unit 7, for storage of calculated values of signals shaped by the unit 3, and signal processor 8. The clock input of the memory unit 7 is connected to a clock output of the former 4.

Control input of the former 4, control input of the switch 6, and also the data inputs—outputs of the signal processor 8 and unit 5 are connected by the appropriate data buses to the decision-making unit 9, whose structure includes a microprocessor for data processing, controller and memory unit for storage of programs and data.

The decision-making unit 9 is connected to the data input-output unit 10 and to the transceiver unit 11, executing reception and transmission of signals and data through the communication channel linking the receiver to a base station 12. In that case, when in the former 4 the tuning (synchronization) of the reference generator is performed using an external signal, the output of a reference signal (signal of synchronization) of transceiver unit 11 is supplied to the appropriate input of the former 4 (in FIG. 1, this connection is shown by a dotted line).

The data input-output unit 10 can be realized, for example, by an appropriate controller, keypad, and display supplied with an interface connector.

The transceiver unit 11 is realized as a modem and transceiver maintaining radio communication with a base station 12.

The base station 12 is supplied with means for a signal reception of an alarm and locating information of the receiver, and also with its own means for formation of the ephemeral data, rough coordinate information on position of the receiver, data of Doppler shift and means for transmission of these data through a radio channel to the unit 11. Besides, the base station 12 can be supplied with means for implementation of transmission of a reference signal for the said tuning of frequency of the reference generator of the receiver.

The receiver—prototype operates as follows. The GPS signals from an output of a receive antenna go to an input of the radio frequency converter 2 of the input unit 1, where the signal conditioning with downturn of frequency takes place. The mixers, which are included in a structure of the converter 2, working on heterodyne signals (Fr), coming from the appropriate outputs of the former 4, are used.

The former 4 synthesizes signals of clock (Ft) and heterodyne (Fr) frequencies, using for this purpose a signal of a reference frequency shaped by the reference generator included in a structure of the former 4. The pre-set of values of frequencies, shaped by synthesizers, is effected by applying to control inputs of synthesizers appropriate adjusting codes shaped by the unit 9.

From an output of the radio frequency converter 2 signals go to an input of the analog-to-digital conversions of a signal unit 3, where they will be converted to a digital kind. The sampling rate on time at analog-to-digital conversion is determined by a clock signal (Ft), coming from a clock output of the former 4. The output signals of the unit 3 form output signals of an put unit 1.

From an output of an input unit 1 signals go to an input of the switch 6, which operates under the influence of a control signal formed by unit 9.

In a usual mode, i.e. in the absence of blockage of GPS signals, the switch 6 executes connection of the unit 1 with the unit 5, which executes conventional correlation processing of received GPS signals, including searching for signals of frequency and delay, tracking of code, frequency and phase of carrier signals, extraction and decoding of a service information about ephemerises, extraction of the navigational information (determination of radio navigational parameter—RNP). In particular, thus the determination of a temporal position of peaks of correlation fnctions of pseudo-noise signals of visible satellites used in the unit 5 in calculations of position. The correlation processing in the unit 5 is implemented with a clock rate determined by a clock signal (Ft), coming from a clock output of the former 4.

The locating information goes through the controller of the decision-making unit 9 to the unit 10 responsible for input-outputs of the data, where, for example, they are represented on the display.

The locating information goes also to the transceiver unit 11, which, in a communication session with a base station, transmits to a base station 12 locating information and, in case of an extreme situation, message on an extreme situation—alarm signal, which is shaped by means of the unit 10 and controller of the unit 11.

At a base station 12, independently of the functioning of the receiver, the formation of the ephemeral data, rough coordinate 180 information on position of the receiver and data of Doppler shift takes place, which through communication channel in communication sessions are transmitted to the transceiver unit 11. These data are used in operation of the receiver in adverse conditions of reception at a bad signal to noise ratio (i.e. in conditions of blockage of GPS signals).

In the said adverse conditions of reception (in conditions of blockage of GPS signals) the switch 6 connects an output of the unit 1 to an input of the memory unit 7, executing storage of calculated values of signals shaped by the unit 3.

The switching of the switch 6 will be performed by a signal shaped by the unit 9, for example, by results of unsuccessful searching for signals in the unit 5 or on a signal of the operator coming from the unit 10.

The unit 7 executes preliminary memorizing of all calculated values of signals shaped by the unit 3, on an interval of about 1 second, i.e., $(2\times10^6$–$4\times10^6)$ calculated values. The stored calculated values of signals go to unit 7 with a clock rate determined by a clock signal (Ft), coming from a clock output of the former 4, i.e., with frequency (2–4) MHz.

Calculated values stored in memory unit 7 are used many times by the signal processor 8, which executes, by purely software means, correlation processing of received GPS signals and determines a temporal position of a maximum of a correlation function for a signal of each satellite, i.e., its pseudo-range. The measured pseudo-ranges go to the processor of the unit 9, where the position-fix takes place. Thus, for implementation of correlation processing and the position-fix in said adverse conditions of reception, the ephemerical data, rough information on position (to within ±150 km) and Doppler shifts of carrier frequencies of satellites obtained by the unit 9 on communication channel from a base station 12 are used. Besides, with the help of a clock signal transmitted by a base station 12, the frequency of the reference generator of the former 4 (described above) is tuned, or the frequency drift of the reference generator from a nominal value is measured.

The locating information determined in the unit 9, go to the unit 10 for indication, and also to the unit 11 for transmission to the base station 12, which tracks the receiver. Together with a locating information transmitted to a base station, if necessary, the messages on extreme situations—alarm signals—are transmitted, which are shaped by means of the unit 10 and are transmitted through a communication channel to a base station 12 with the help of the unit 11.

Thus, receiver-prototype provides a capability of position-fix and transmission of alarm signal together with a locating information both in a normal conditions of GPS signal reception, and in conditions of signal blockage, that determines the receiver—prototype's capability of use in systems of personal safety.

The realization of said functions in the receiver—prototype was implemented at the expense of its essential complication in comparison with conventional receivers of GPS signals. That is, in addition to usual units 1 and 5, used in conventional GPS receivers, in the receiver—prototype the decision-making unit 9 and signal processor 8, implemented on the basis of a fast-response microcomputer, and also the memory unit 7, implemented on the basis of a fast-response RAM of a high capacity for storage of calculated values, which, as a rule, is characterized by high power consumption and cost. All these contribute to big overall dimensions, weight, power consumption and cost of the receiver.

SUMMARY OF THE INVENTION

The problem which is solved by the present invention, is the creation of a receiver of GPS signals for a system of personal safety, which, in contrast to conventional receivers and to the receiver—prototype described above, is easy to realize, has lower power consumption, smaller overall dimensions and weight, smaller cost, and at the same time, retains all functions of the receiver—prototype and achieves about the same characteristics on a position-fix in an adverse conditions of GPS signal reception.

According to an embodiment of the present invention, the receiver of GPS signals for a system of personal safety contains sequentially joint input and output units, data input-output unit and transceiver unit intended for reception and transmission of signals and data on a communication channel linking the receiver to a base station. The reference signal output of the transceiver unit is connected to a reference input of an input unit. The clock input of the output unit is connected to a clock output of an input unit. The input unit contains sequentially joint radio frequency converter, whose signal input is a signal input of an input unit, and unit of analog-to-digital signal converter, whose output is a signal output of an input unit, and also a former of signals of clock and heterodyne frequencies, whose reference input is a reference input of an input unit. The heterodyne output of the generator of signals of clock and heterodyne frequencies is connected to a heterodyne input of the radio frequency converter of signals, and the clock output, which is a clock output of an input unit, is connected to a clock input of the unit of analog-to-digital conversion of signals. The output unit of the receiver of GPS signals is a unit containing multichannel digital correlator, where N=8–12 channels of parallel processing, linked with a microprocessor equipped with permanent storage, for storing signal processing programs and operative storage, for data storage when operating in a standard mode without blockage of GPS signals. The microprocessor of the output unit is connected by data buses to the generator of signals of clock and heterodyne frequencies of the input unit, to the data input-output unit, to the transceiver unit and to an additional unit for permanent storage of signal processing programs and operative storage of data and calculation values of the multichannel digital correlator operating in conditions of blockage of GPS signals. Each of the N channels of the multichannel digital correlator is equipped with K inphase and K quadrature correlators, where K=20–40, connected with the appropriate storage units ensuring the capability of simultaneous correlation of GPS signals with K copies of C/A code, shifted by one half of a digit of C/A code of a GPS, and coherent accumulation of the results of correlation on an interval equal to duration of epoch of C/A code.

In a preferred embodiment of the present invention, the receiver is designed in such a way that each of the channels of the multichannel digital correlator comprises: a digital controlled generator of a carrier frequency; a control register; a digital controlled code generator; a generator of reference C/A code of GPS; a programmed delay line; first and second digital mixers of inphase and quadrature processing channels, respectively; first and second groups of K inphase and quadrature correlators, whose first inputs are connected to out-puts of the appropriate digital mixers, second inputs are connected to the appropriate outputs of a programmed delay line, and outputs are connected to signal inputs of the appropriate storage units; and a data exchange unit linking the outputs of storage units, control input of the digital controlled generator of carrying frequency, control input of the register of control input of the digital controlled generator of a code and first input of the generator of reference C/A code with the microprocessor of the output unit. The signal inputs, linked with each other, of digital mixers form a signal input of the channel. Linked with each other, the clock inputs of the controlled digital generator of the carrier frequency, of the digital controlled generator of a code of a programmed delay line and of the storage units, form a clock input of a channel. The second inputs of the first and second digital mixers are connected respectively to the first and second outputs of the digital controlled generator of the carrier frequency. The signal and control inputs of a programmed delay line are connected respectively to an output of the generator of reference C/A code of the GPS and to the first output of the control register. The second out-put of the control register is connected to the second input of the generator of reference C/A code of the GPS. The third input of the generator of reference C/A code of the GPS is connected to an output of the digital controlled generator of the code. In the multichannel digital correlator, the signal inputs of channels, linked with each other, and the clock inputs of channels, also linked with each other, form, respectively, the signal and clock inputs of the multichannel digital correlator.

BRIEF DESCRIPTION OF THE DRAWINGS

Preferred embodiments of the present invention and its industrial applicability are illustrated by the drawings, FIGS. 1 to 6.

DETAILED DESCRIPTION OF THE PREFERRED EMBODIMENTS OF THE INVENTION

Figure 2:
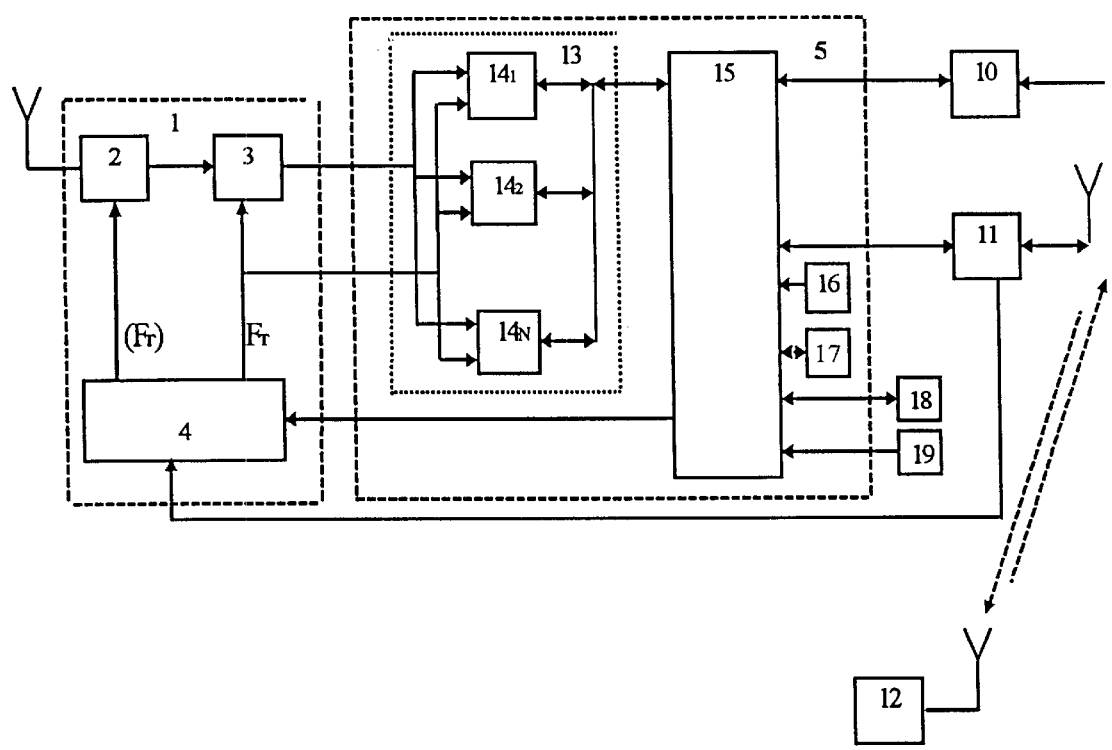
FIG. 2 is a generalized block diagram a receiver according to the present invention.

The receiver according to the present invention comprises (see FIGS. 2–3) an input unit 1, including sequentially connected radio frequency signal converter 2, whose signal input is a signal input of the unit 1, and unit 3 for analog-to-digital conversions of signals, whose output is a signal output of the unit 1, and also former 4 of signals of clock and heterodyne frequencies, whose reference input is a reference input of the unit 1, whereas a heterodyne input of the radio frequency signal converter 2 and clock input of the unit 3 are connected respectively to heterodyne and clock signal outputs of the former 4.

The former 4 is supplied with means for formation of signals of clock and heterodyne frequencies including, for example, synthesizers of frequencies. The synthesizers of frequencies work from the reference generator which is in-eluded in a structure of the former 4. The reference generator used in the former 4, is supplied with, for example, unit of a PLL, with whose help will be determined the shift of its frequency in relation to the frequency of an external high-stability reference signal. This shift characterizes deviation of frequency of the reference generator from a nominal value. In the presence of the unit PLL, the reference generator can be made as a simple, not compensated, chip. The reference input of the unit PLL forms a reference input of the former 4, output of the unit PLLF, on which the data about deviation of frequency of the reference generator from a nominal value are shaped, and the inputs of a pre-set of synthesizers form a data input—output of the former 4. Alternatively, the PLLF unit (synchronization) of frequency of the reference generator of the receiver implements the fine tuning pursuant to an external high-stability reference signal. In this case data about deviation of frequency of the reference generator in the former 4 are not shaped, and in the considered below algorithms of activity the deviation of frequency of the reference generator from a nominal value is taken as zero.

A receiver according to the present invention also contains the output unit 5, whose signal and clock inputs are connected to a signal and clock output of the unit 3. Also connected with the unit 5 are data input-output unit 10 and transceiver unit 11, intended for a reception and transmission of both signals and data on communication channel linking the receiver to a base station 12. The output of a reference signal of the transceiver unit 11 is connected to a reference input of an input unit 1, i.e., to a reference input of the former 4.

The data input-output unit 10 is realized, for example, by an appropriate controller, keypad, or display and is supplied with an interface connector.

The transceiver unit 11 is realized by a modem and transceiver executing on a radio channel the communication of the receiver with a base station 12.

The base station 12 is supplied with means for reception of the messages about extreme situations (alarm signals) and locating information of the receiver, and also means for own formation of the ephemerical data, rough coordinate information on the position of the receiver, data of Doppler shift of carrier frequencies of satellites GPS and means for transmission of these data on a radio channel to the unit 11 on a high-stability carrier frequency.

As means for a reception both the transmission of the said signals and data on a radio channel, the base station 12 can be equipped, for example, with an appropriate transceiver means of a base station of a cellular telephone network. In this case, an appropriate transceiver unit of a radiophone can be used as the transceiver unit 11 of the according to the present invention, and receiver can be structurally located in a body of this radiophone.

In the receiver according to the present invention, output unit 5 comprises a unit containing multichannel digital correlator 13, which contains N channels 14 ($14_1$, $14_2$, ... $14_N$), where N=8–12, intended for parallel signal processing of signals N=8–12 of GPS satellites. The signal and clock inputs of channels 14 form signal and clock inputs of the correlator 13. In the unit 5, correlator 13 is connected to the microprocessor 15, equipped with permanent memory storage (ROM) 16 for storage of the programs of signal processing and operational memory storage (RAM) 17 for data storage in cases where the receiver works in a standard mode—in absence of blockage of GPS signals. The absence of blockage is characterized by the relation of a signal strength to a spectral concentration of a noise exceeding threshold value 34–37 db·Hz.

The microprocessor 15 of output unit 5 is connected by data buses to data input—output of the former 4 of the input unit 1, to the data input-output unit 10, to the transceiver unit 11 and to an additional ROM 18, for storage of signal processing programs, and RAM 19, for storage of data and calculated values of the multichannel digital correlator 13 calculated during conditions of blockage of GPS signals.

Figure 3:
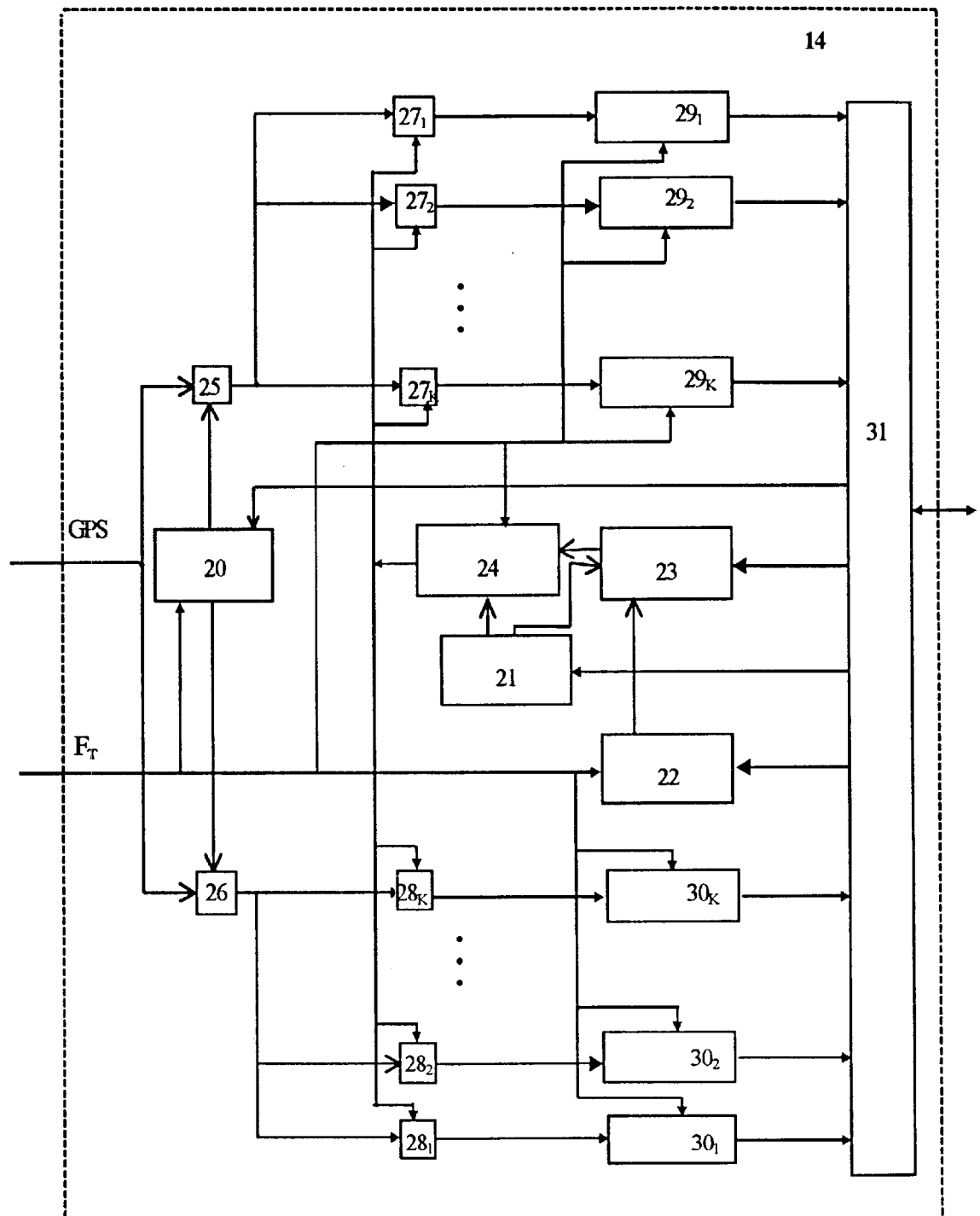
FIG. 3 is a block diagram of one channel of the multichannel digital correlator implemented in according to an embodiment of the present invention.

In a preferred embodiment of the present invention as illustrated in FIG. 3, each of the channels 14 of the multichannel digital correlator 13 comprises: digital controlled generator 20 of carrier frequency; control register 21; digital controlled code generator 22; generator 23 of reference C/A code of GPS; programmed delay line 24; first and second digital mixers 25 and 26 of inphase and quadrature channels of correlation processing, respectively; first and second groups of K correlators: inphase $27_1$–$27_K$ and quadrature $28_1$–$28_K$, where K=20–40, connected with the corresponding storage units $29_1$–$29_K$ and $30_1$–$30_K$; and data exchange unit 31 linking outputs of storage units $29_1$–$29_K$ and $30_1$–$30_K$, control input of the digital con-trolled generator 20 of carrier frequency, control input of the control register 21, control input of the digital controlled code generator 22 and first input of the generator 23 of reference C/A code with the microprocessor 15.

In each of channels 14, signal inputs of digital mixers 20 and 26 are connected among themselves and form a signal input of a channel 14. Joint among themselves signal inputs of channels $14_1$–$14_N$ form a signal input of the correlator 13.

In each of channels 14, clock inputs of the digital controlled generator 20 of the carrier frequency, digital controlled code generator 22, programmed delay line 24 and storage units $29_1$–$29_K$ and $30_1$–$30_K$ are connected among themselves and form a clock input of a channel 14. Joint among themselves clock inputs of channels $14_1$–$14_N$ form a clock input of the correlator 13.

The second inputs of mixers 25 and 26 are connected respectively to the first and second outputs of the digital controlled generator 20 of the carrier frequency. The output of the digital mixer 25 is connected to the first inputs of correlators $27_1$–$27_K$. The output of the digital mixer 26 is connected to the first inputs of correlators $28_1$–$28_K$.

The outputs of correlators $27_1$–$27_K$ and $28_1$–$28_K$ are connected respectively to signal inputs of storage units $29_1$–$29_K$ and $30_1$–$30_K$.

The second inputs of correlators $27_1$–$27_K$ and $28_1$–$28_K$ are connected to the appropriate outputs of a programmed delay line 24. The signal input of a programmed delay line 24 is connected to an output of the generator 23 of reference C/A code of GPS. The control input of a programmed delay line 24 is connected to the first output of the control register 21. The second output of the control register 21 is connected to the second input of the generator 23 of reference C/A code of GPS, whose third input is connected to an output of the digital controlled code generator 22.

The receiver according to the present invention operates as follows.

The receiver should be disposed in a zone of clear radio communication with a base station 12. Practically, for a position-fix in all cases considered below of a signal reception GPS, the receiver should be disposed within the limits of radius up to 150 km from a base station 12.

The base station 12 executes, independently from the receiver, formation of the ephemerical data, data of the rough coordinate of site of the receiver (to within ±150 km) and Doppler shifts of carrier frequencies of visible satellites GPS. These data are transmitted to the unit 11 of the receiver on a high-stability carrier frequency in scheduled communication sessions.

Generated at a base station 12 data of ephemerises, data of the rough coordinates and data of Doppler shifts of carrier frequencies of visible satellites GPS, received by the unit 11 on communication channel, are used in the course of the receiver operation in the adverse conditions of a signal reception GPS (in conditions of blockage).

The high-stability carrier frequency, on which said data are transmitted, is used in the receiver as an external high-stability reference frequency, in relation to which the estimation of deviation of frequency of the reference generator of the former 4 from a nominal value is implements. An estimation of deviation of frequency of the reference generator from a nominal value is executed with the help of the appropriate unit PLL in the former 4, the data of an estimation are transmitted to microprocessor 15, where the information is stored in a RAM 19.

Alternative version is that, in which the former 4 executes fine tuning (synchronization) of frequency of the reference generator of the receiver pursuant to an external high-stability reference signal. In this case, data about deviation of frequency of the reference generator in the former 4 are not shaped and not transmitted to the microprocessor 15, and in the considered below process algorithms, the deviation of frequency of the reference generator from a nominal value is taken as zero.

Position-fix is executed in the receiver according to the present invention based on three algorithms de-pending on conditions of a signal reception GPS.

In application of all three algorithms, the GPS signals are first converted in an input unit 1. During this conversion the GPS signals, received by an antenna, go to an input of the radio frequency converter 2, where the conversion of signals is executed with reduction of frequency. Mixers are used which are included in a structure of the radio frequency converter 2, working on heterodyne signals (Fr), coming from appropriate outputs of the former 4.

In the former 4 signals of clock (Ft) and heterodyne (Fr) frequencies are synthesized with the help of synthesizers of frequencies working from a reference signal, shaped by the reference generator which is included in a structure of the former 4. A pre-set of values of frequencies, shaped by synthesizers, is done by directing of the appropriate adjusting code from the microprocessor 15. An estimation of deviation of frequency of the reference generator from a nominal value is execute based on a high-stability reference signal coming from the transceiver unit 11 in communication sessions with a base station 12. The knowledge of deviation of frequency of the reference generator from a nominal value allows to realize all functions of the receiver according to the present invention with the help of a simple (without thermocompensation) crystal oscillator, for example of simple, not compensated chip.

From an output of the radio frequency converter 2 signals goes to an input of the unit 3 for analog-to-digital conversions of signals, where they are converted to a digital kind. The sampling rate on time at analog-to-digital conversion in the unit 3 is determined by a clock signal (Ft), coming from the appropriate output of the former 4. The output signals of the unit 3 form output signals of an input unit 1.

From an output of an input unit 1 signals go to an input of the unit 5, where with the help of the multichannel digital correlator 13 and microprocessor 15, connected with a ROM 16, 18 and RAM 17, 19, and also with units 10 and 11, a position-fix is executed on the basis of received GPS signals.

Figure 1:
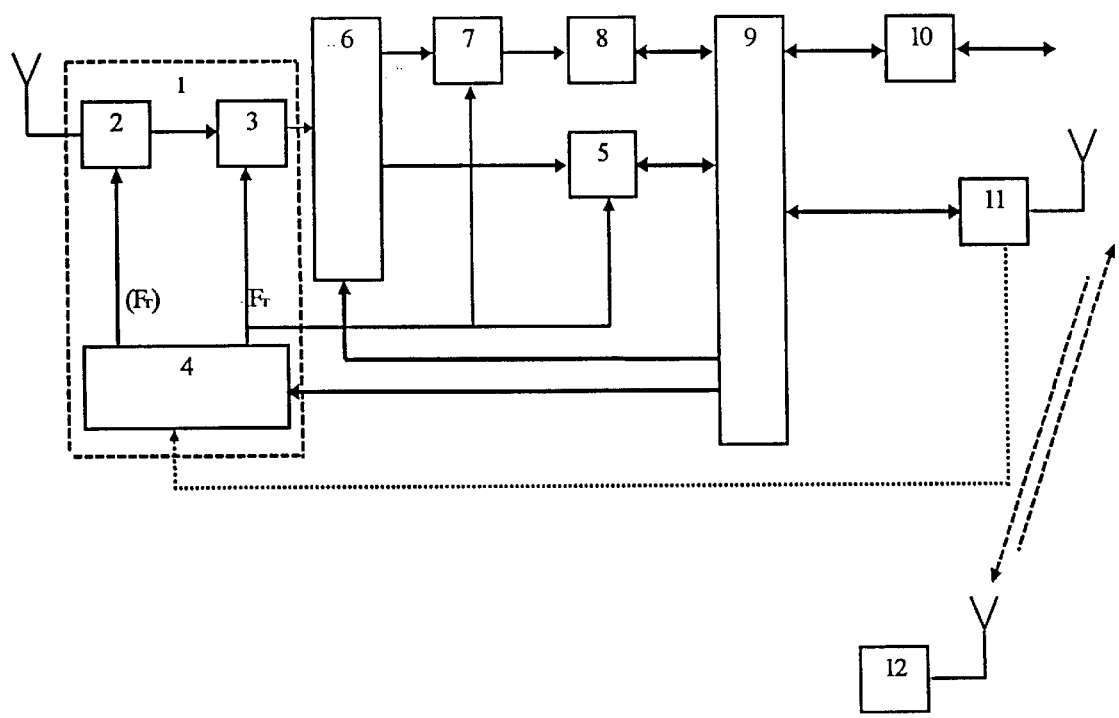
FIG. 1 is a generalized block diagram of the receiver-prototype.

In the receiver according to the present invention, the position-fix is based on processing of accumulated short—period (msec) samples from outputs of quadrature correlators $27_1$–$27_K$ and $28_1$–$28_K$ in each of channels 14 of multi-channel digital correlators 13. Thus, in the receiver according to the present invention, a correlation is carried out by hardware means only, i.e., by means of the digital correlator 13. It distinguishes the receiver according to the present invention from the receiver—prototype, where in an adverse conditions of a reception a correlation is carried out by means of software, i.e. by means of the signal processor 8 (FIG. 1), operating accumulated samples obtained as a result of analog-to-digital conversion of GPS signals in the unit 3.

The channels 14 of the digital correlator 13 works as follows. The quantized GPS signals, obtained as a result of analog-to-digital conversion in the unit 3, are directed, in each of channels 14, to signal inputs of digital mixers 25 and 26. The digital controlled generator 20 of the carrier frequency works out inphase and quadrature component phases of the carrier frequency appropriate to a chosen satellite GPS, whose signal is processed in the given channel. The signals shaped by the generator 20, are multiplied with an input signal in digital mixers 25 and 26.

With the help of digital mixers 25 and 26 a signal recovery of the given satellite GPS is provided, as well as the transfer of a spectrum of this signal to basic frequency band (to a zero frequency). Thus, as a result of a frequency multiplex of signals in digital mixers 25 and 26 the "removal" of the carrier frequency (inphase and quadrature components of a processed signal) takes place.

The digital controlled generator 20 of the carrier frequency is controlled by the microprocessor 15 through the unit 31 of data exchanges for closing of loops of tracking behind frequency and phase of the carrier frequency of an input signal. Thus a frequency rate of an output signal shaped by the digital controlled generator 20 of the carrier frequency, is established in conformity with the data stored in a ROM 16.

After "removal" of the carrier frequency in digital mixers 25 and 26 inphase and quadrature components of a signal are correlated in groups from K correlators $27_1$–$27_K$ and $28_1$–$28_K$ with the appropriate copies of reference C/A code shifted in time with respect to each other by one half of a digit of C/A code of GPS.

Copies of reference code C/A used in activity of correlators $27_1$–$27_K$ and $28_1$–$28_K$ are shaped with the help of a programmed delay line 24, generator 23 reference C/A code of GPS and digital controlled generator. Thus, with the help of the digital controlled code generator 22, there is generated a clock signal of C/A code (1.023 MHz), which is supplied to the appropriate input of the generator 23 of reference C/A code of GPS. Selection of value of a clock rate of a code is executed pursuant to commands of the calculator 15, coming to a control input of the generator 22 through the data exchange unit 31. Based on a clock signal of C/A code coming from an output of the digital controlled code generator 22, the generator 23 of the reference C/A code generates reference C/A code for processing in the given channel 14 of a signal of the appropriate satellite GPS, which is unique for each satellite GPS. Selection of a code, i.e., selection of a certain pseudo-random code sequence (PRC), is executed pursuant to commands of the calculator 15, coming to the first input of the generator 23 through the data exchange unit 31, and commands coming to the second input of the generator 23 from the second outputs of the control register 21. Generated by the generator 23, reference code C/A is supplied to a programmed delay line 24, in which a shift of the reference code C/A is executed for certain time intervals in conformity with control signals shaped by the control register 21. The temporal algorithm of activity of a programmed delay line 24 is set by control signals shaped by the control register 21 on the basis of commands, coming from the calculator 15 through the data exchange unit 31.

Copies of reference C/A code shaped at the output of delay line 24 go to the second inputs of correlators $27_1$–$27_K$ and $28_1$–$28_K$.

The results of correlation processing which is carried out in correlators $27_1$–$27_K$ and $28_1$–$28_K$, are accumulated in the appropriate storage units $29_1$–$29_K$ and $30_1$–$30_K$ at a time interval equal to duration of epoch of a code (1 msec.), are read out by the processor 15 through the data exchange unit 31 in a RAM 17 and are used for closing of loops of code tracking and tracking of the carrier frequency of a processed signal.

By results of correlation signal processing GPS, made in each of channels 14 of digital correlator 13, with the help of the processor 15 a position-fix is executed, the data about which then go to the unit 10.

The activity of the microprocessor 15 of unit 5 depending on conditions of a signal reception GPS is implemented using on one of three considered below algorithms.

Figure 4:
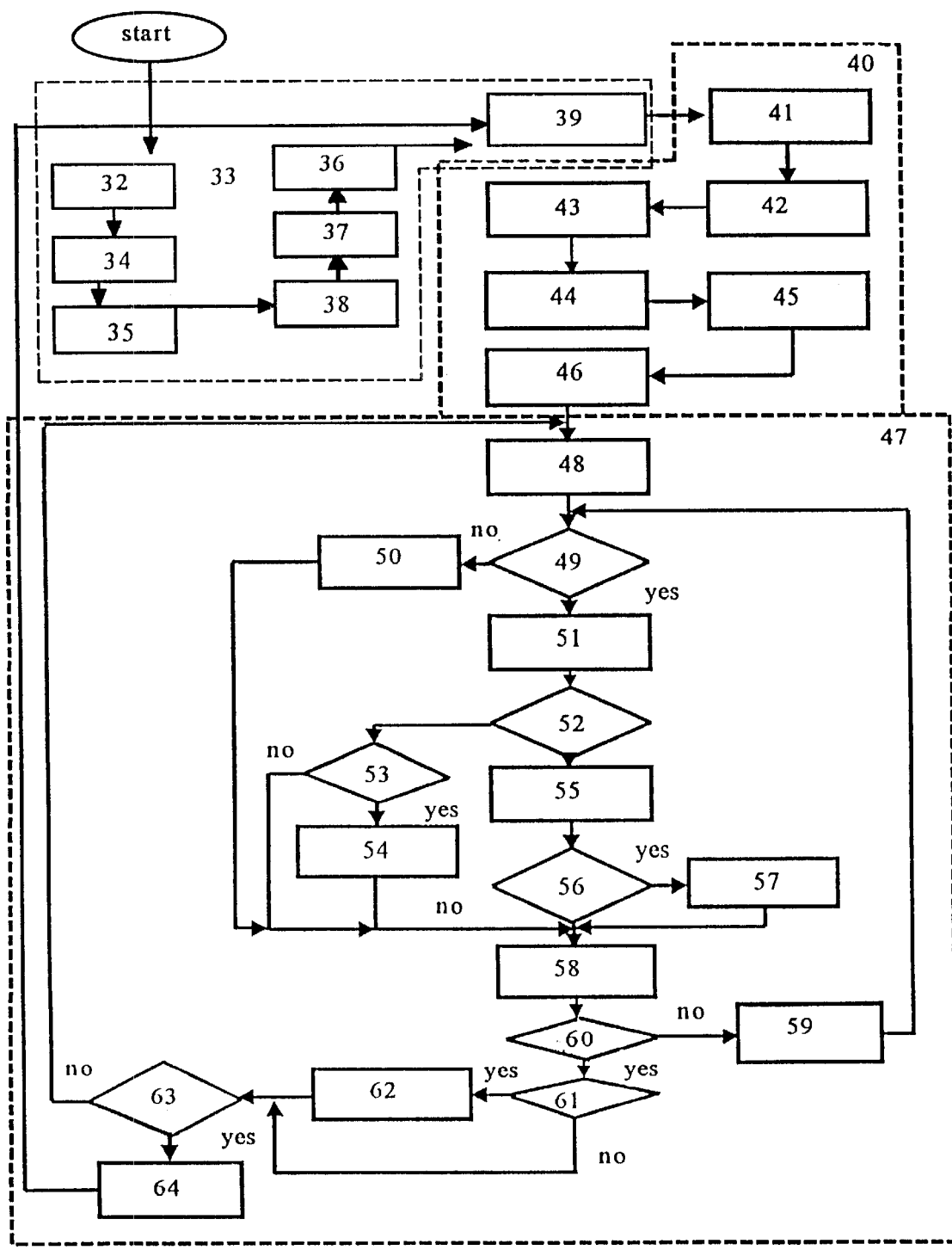
FIG. 4 is a block-diagram of an algorithm of signal processing used in a receiver according to the present invention during operation in a usual mode, i.e., in the absence of blockage of GPS signals.

The first algorithm (FIG. 4) is used in usual conditions of a signal reception GPS in the absence of blockage, i.e. at the ratio of a signal strength to a spectral concentration of a noise greater than 34–37 db·Hz. This is a standard threshold signal to noise ratio for the conventional receiver GPS. In using this algorithm the means of the unit 5, i.e., units 13–17, should be involved.

The first algorithm is as follows. In the beginning visible satellites (unit 32) are being determined, then synchronization of GPS signals (unit 33) should be executed.

The synchronization includes calculation of range of searching by frequency and delay (unit 34), searching for signals of visible satellites on frequency and delay (unit 35), acquisition of a signal by systems tracking code and phase of the carrier frequency (unit 36), symbolical synchronization of GPS signals (unit 37), field synchronization of GPS signals (unit 38) and reception of ephemerises of visible satellites (unit 39).

Then, tracking of GPS signals is executed (unit 40). The tracking includes establishing the number of the first visible satellite (unit 41), entering into tracking of a code (unit 42), establishing an attribute of blockage of a signal of the given visible satellite (unit 43), tracking a code (unit 44), entering into tracking of a phase of the carrier frequency (unit 45), entering into tracking of frequency (unit 46) and frequency lock loop (unit 47), tracking a phase of the carrier frequency (unit 48), determination of necessity of updating of ephemerises (unit 49), reception of ephemerises (unit 50), measurement of pseudo-range and Doppler frequency shift (unit 51), modification of number of a visible satellite (unit 52) by results of signal processing of all visible satellites (unit 53), determination of number of the not blocked visible satellites, sufficient for the solution of a navigational task (unit 54), solution of a navigational task (unit 55), determination of necessity of change of visible satellites (unit 56), preparation to change of completely blocked satellites, if they are (unit 57).

The results of the solution of a navigational task are supplied to the data input-output unit 10, for example, for indication of position. In case of necessity (in extreme situations) the position data together with the alarm signals are transmitted with the help of the unit 11 on communication channel to a base station 12.

The characteristic feature of the given algorithm is the following. If in usual algorithms installed in output units of conventional receivers, including the receiver—prototype, the "blocked" signal is the signal of a satellite, for which the tracking of code and phase of the carrier frequency is lost, and the updating of ephemerises takes place at 30 minutes interval, and change of constellations—takes place irrespective of blockage, then, in the receiver according to the present invention, after the loss of tracking of the phase by means of an automatic phase lock loop (PLL) the other system for tracking frequency—a frequency lock loop (FLL)—is activated and, if the system FLL loses tracking, the tracking of code goes on. The signal is considered to be "blocked", if the tracking of a code is lost. Thus, by the appropriate selection of parameters for FLL system and for code tracking system, it is possible to continue to monitor the object in conditions of failure to track a phase of the carrier frequency. Thus, in contrast to tracking of a phase, there is no periodic (one time in 30 minutes) updating of ephemerises. However, if updating of ephemerises does not takes place within the limits of 1 to 2 hours, the deterioration of accuracy is insignificant. Practically, the receiver according to the present invention is capable of keeping track of frequency of previously locked GPS signals with the help of a system FLL with mean-square error of 7 to 15 Hz and tracking a code with mean-square error of up to 20 m (even at width of an interval between early and late copies of a code equal to one digit of C/A code up to a signal/noise ratio of 17 to 20 db·Hz at a unilateral band of follow-up systems of 0.5 to 1 Hz. It allows to continue position-fix on current working constellation without changing operational mode of the receiver.

Other difference of the algorithm according to the present invention from conventional is that at presence of blockage and necessity of change of visible satellites, the change only of completely blocked satellites is implemented.

The second algorithm is used in extreme situations in cases, when the blockage of GPS signals arises during activity of the receiver, when there is no the solution of a navigational task by the first algorithm, and thus there is a necessity for change of working constellation. At realization of this algorithm apart from means of the unit 5 there is used a ROM 18 and RAM 19, units 10 and 11, and also information support on the part of a base station 12 as ephemerises for satellites of new constellation. The necessity of such information support is needed because in such conditions of blockage (at a low signal to noise ratio) the ephemerises can not be adopted by the receiver independently, so PLL in these conditions does not operate. The second algorithm is used when there exists exact data obtained by results of the previous activity of the receiver with use of the first algorithm. Thus, the necessary structure of the exact data includes the data about a place (with accuracy of 1.5 km or 3 km accordingly at number K=20 or K=40 of quadrature correlators $27_1$–$27_K$ and $28_1$–$28_K$ in each of channels 14), estimation of Doppler shift of frequency and frequency drift of the reference generator of the former 4 (with accuracy of ±10 Hz), data about time (with accuracy of ±1 msec.), and also data about ephemerises on new satellites obtained by the inquiry (or on the alarm signal) from a base station 12. These data allow to execute fast (trackless) lock of signals based on code and frequency and to determine coordinates of site in, approximately, 1 sec, i.e., the same as in the receiver-prototype.

The essence of the given algorithm allowing to execute said accelerated position-fix in said conditions, is that the correlators $27_1$–$27_K$ and $28_1$–$28_K$ of channels $14_1$–$14_N$ are arranged around of computational pseudo-range, then execute accumulation (memorizing in a RAM 19) of millisecond of calculated values (inphase Ii and quadrature Qi) of outputs of each (i) of the quadrature correlators of channels 27$_1$–27$_K$ and 28$_1$–28$_K$ at an interval of 1 sec, then, taking into consideration the position of margins of digits of the information, evaluate modules (or squares of modules) using the formula:

$$\rho^2 = \sum_1^{M/20} \left[ \left(\sum_1^{20} I_i\right)^2 + \left(\sum_1^{20} Q_1\right)^2 \right], \quad 1)$$

where M=1000 is the total number of calculations at an interval of 1 sec, after which there are determined two maxima which are used for determining pseudo-range by interpolation, using an algorithm similar to the one disclosed in reference [9].

All these operations make of each channel 14, i.e., for each visible satellite GPS, whose signals are processed in the receiver. Since the above-mentioned a priori data are exact, these maxima characterize a real position of peak of a correlation function and there is no need to shift PRC to on any other temporal position.

As described above, in the receiver according to the present invention, in contrast to receiver—prototype, one accumulates not the calculated values in an output of the analog-to-digital conversions unit 3 performed at a clock rate Ft, but millisecond calculated valued in an output of quadrature correlators 27$_1$–27$_K$ and 28$_1$–28$_K$. Thus, a correlation is executed not by means of software, as in the prototype, but by means of hardware—only by means of the correlator 13.

Since in the present data conditions it is enough only once to accumulate samples on an interval of 1 sec, not shifting PRC to any other temporal position, no loss of time in determination of coordinates takes place in the receiver according to the present invention, in contrast to the receiver—prototype.

Figure 5:
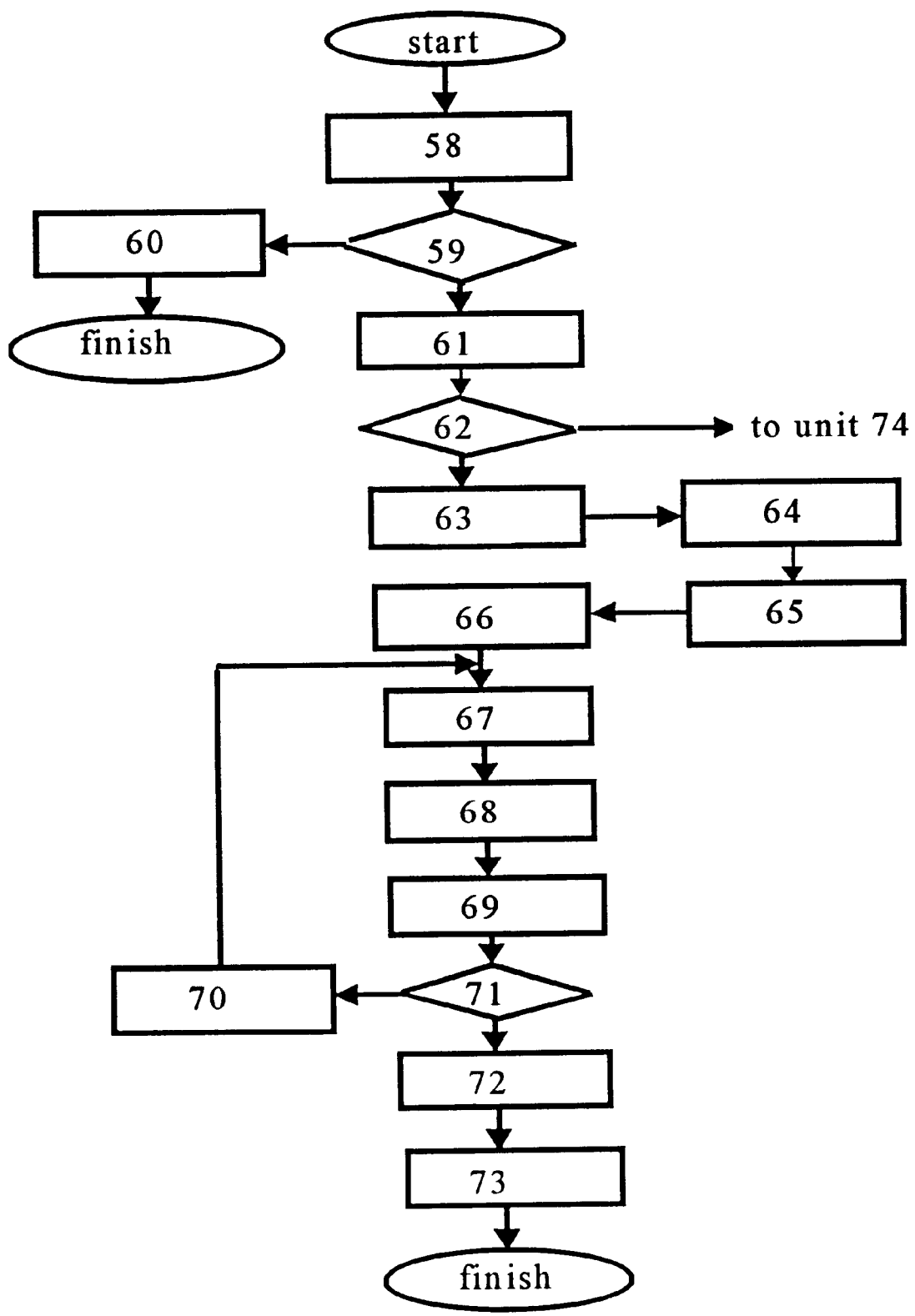
FIG. 5 is a block-diagram of an algorithm of signal processing used in a receiver according to the present invention in conditions of blockage of GPS signals, which happened in the course of receiver operation.

The essence of the second algorithm and operational sequence is illustrated by the flow chart of algorithm set forth in FIG. 5. The operational sequence is as follows.

After formation with the help of the unit 10 of alarm signals (unit 58), navigational task is decided by the considered above methods (unit 59) using the first algorithm. In case of the positive solution of a task, transmission of the alarm signal and coordinates of site to a base station 12 on communication channel (unit 60) is executed.

In case of impossibility of the solution of a task by methods of the first algorithm in the beginning, only transmission of the alarm signal on a base station (unit 61) is executed. Then, in that case, when there are exact a priori data, i.e., data of a place, estimation of frequency of the reference generator, correct time, the Doppler shifts of carrier frequencies (unit 62), a reception of ephemerises on visible satellites on communication channel with a base station 12 (unit 63) is executed.

After that, installation of channels 14$_1$–14$_N$ of the digital correlator 13 (i.e. digital controlled generators 22 codes, digital controlled generators 23 C/A of a code GPS and digital controlled generators carrying frequency 20 channels) is executed based on the exact data and ephemerises on the satellite (unit 64), in the meantime, mean of K quadrature correlators 27$_1$–27$_K$ and 28$_1$–28$_K$ of each channel 14$_1$–14$_N$ is established based on the calculated values of delay and frequency of the carrier frequency.

Further, the calculated values (inphase I and quadrature Q) from outputs of correlators 27$_1$–27$_K$ and 28$_1$–28$_K$ of all channels 14 on a time interval 1 sec, i.e. M=1000 samples (unit 65) are accumulated, the number of the first satellite for the first channel 14$_1$ (unit 66) is established, and modules of accumulation in each quadrature correlator for 1 sec in view of margins of digits (unit 67) are found. When finding modules of accumulation on an interval equal to duration of a digit 20 msec, the calculated values in quadrature channels are accumulated coherently, i.e. summed in conformity with the formula (1).

Further, one executes finding of two correlators with maximum modules, i.e. find the first and second maxima (unit 68), then executes interpolating peak of a correlation and finding pseudo-range (unit 69) for this satellite using an algorithm similar to in the one described in reference [9].

Further, process is repeated at the determination of numbers of following satellites (unit 70). Process is repeated until the accumulation in all channels 14$_1$–14$_N$ (unit 71) are processed.

After that, one solves a navigational task (unit 72) and transmits a locating information to a base station 12 (unit 73).

In the event that, at realization of the second algorithm there are no exact a priori data (FIG. 5, the unit 62), or receiver for the first time is actuated in conditions of blockage of a signal, detection of signals does not occur, and the further activity is implemented using the third algorithm.

The conditions of realization of the third algorithm are characterized by that there are no data, except for, maybe, rough time given by internal clock of the microprocessor 15 (if the error is 1 minute, it gives an error in an estimation of Doppler shift of frequency of signals of 60 Hz, if error is 1 second—, then 1 Hz). Therefore, with the help of units 10, 11 one executes a request to a base station 12, in reply to which numbers of visible satellites, ephemeris on visible satellites, the data about time (with accuracy of 1 second) and data about a place (with accuracy not worse than 150 km) are provided.

If the base station is within a radius of ±150 km (but no more), the a priori location co-ordinates are given with same accuracy. It allows to provide the resolution of a multivalence in samples of pseudo-range without symbolical and field synchronization. It is explained by the fact that the period of C/A code of 1 msec corresponds to width of a phase path of 300 km, and the known condition of the resolution of a multivalence corresponds to ½ width of a phase path. As, as is known, 1 km of an in position results in 1 Hz of an error in an estimation of Doppler shift of frequency, it results in necessity to search for a signal not only on delay, but also on frequency to ensure coherent accumulation of the information (inphase samples I and quadrature samples Q) on intervals 4 to 20 msec. The error on frequency at 20 msec. should be no more than 15 Hz, at 10 msec.—no more than 30 Hz, at 4 msec.—no more than 70 Hz, otherwise large power losses take place. Taking this into account, for optimum realization of the given algorithm, the receiver should be positioned within a radius of up to 30 km from a base station. Descriptions of conventional receivers, such as the receiver—prototype do not even mention, let alone address, these issues.

Besides, in above-described conditions to ensure acceptable time for position-fix on GPS signals, from a base station 12 a high-stability sinusoidal synchronizing signal can be received, in relation to which one evaluates deviation of frequency of the reference generator of the former 4 from a nominal value.

The alternative solution is tuning of frequency of the reference generator on a synchronizing signal. The synchronizing signal is not required, if one uses as the reference generator, like it is done in the prototype, an expensive high-stability reference generator ("thermocompensated") with stability ratio not worse than 0.1 ppm.

After obtaining said data from a base station 12 and having defined a frequency drift of the reference generator (or having set it up), with the help of the microprocessor 15 one calculates values of Doppler shift of frequency of signals of visible satellites and sends to digital controlled generators 20 of the carrier frequency in each of channels 14 of digital correlators 13 values of carrier frequencies of the appropriate visible satellites in view of the calculated Doppler shifts, thus placing channels 14 on all visible satellites.

In channels 14 so arranged one executes arrangement of correlators $27_1$–$27_K$ and $28_1$–$28_K$. Arrangement of correlators $27_1$–$27_K$ and $28_1$–$28_K$ is executed by temporal shift of reference codes shaped by a programmed delay line 24, on ½ digits of C/A code. In this case, at K=20 to 40, correlators $27_1$–$27_K$ and $28_1$–$28_K$, used in channels 14, overlap 10 to 20 digits. Since the period of C/A code is 1023 digits, and position of a time scale of the receiver concerning a time scale of a system GPS is not known (since there was no solution of a navigational task earlier), a signal search is performed sequentially, by shift of said correlators of channels by 10 to 20 digits. Maximum number of shifts is 50 to 100 times. As the calculated values from an output of the digital correlator 13 are accumulated during 1 sec, maximum time of detection of signals is 50 to 100 sec. The mean time is twice less, i.e. 25 to 50 sec.

The said temporal loss is the price, which it is necessary to pay for a capability of a position-fix in the data conditions with significant simplification afforded by the receiver according to the present invention. However, practically, said temporal loss at a position-fix in the data conditions are not essential from a point of view of realization by the functional receiver.

In considered here third algorithm the summation of calculated values for different positions of prospective margins of digits is implemented, i.e. with shift on 1 msec in range 0–19 msec, and there are global maxima not only on shifts of a beginning of a period of C/A code, but also on shifts of margins of digits.

The considered third algorithm is realized in a case, when accuracy of calculation of Doppler shift of frequencies and account of a frequency drift of the reference generator give one frequency position. (If the accuracy is worse, the algorithm should be augmented by searching on different frequent positions, which is not considered here.)

Figure 6:
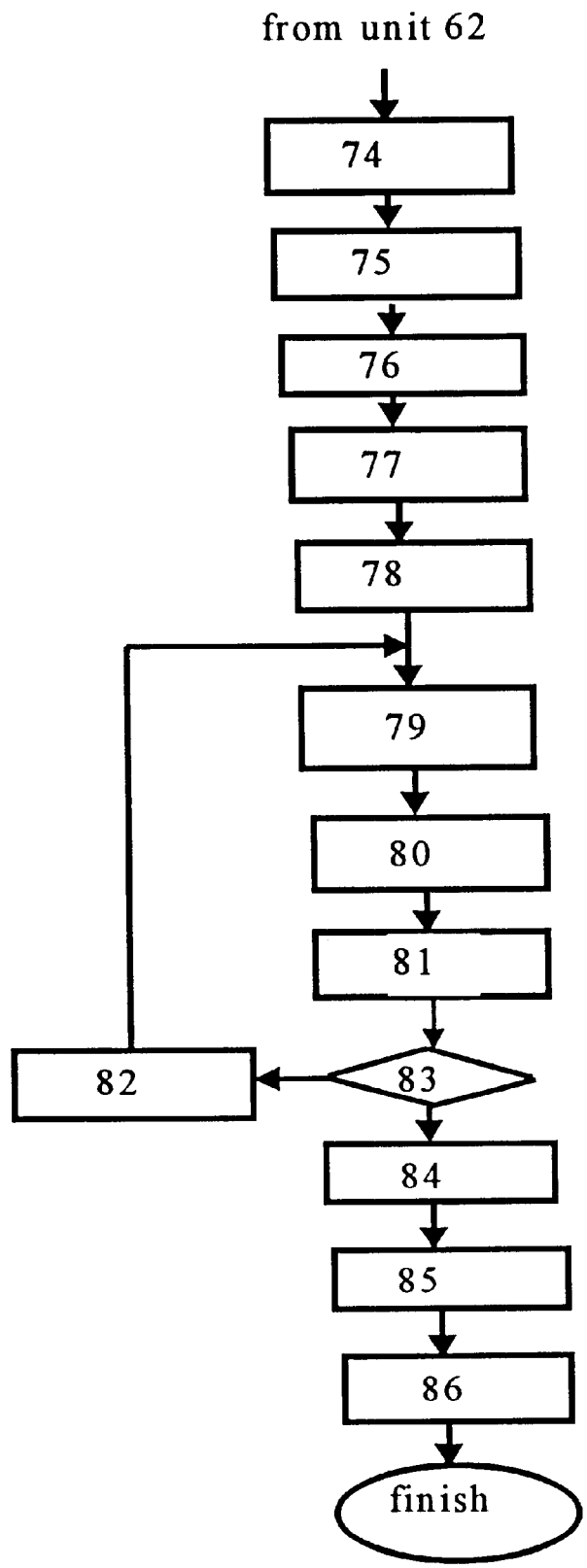
FIG. 6 is a block-diagram, of an algorithm of signal processing used in a receiver according to the present invention at the beginning of activity in conditions of blockage of GPS signals.

The essence of the third algorithm and operational sequence is illustrated by the flow chart of algorithm, set forth in FIG. 6. The operational sequence at realization of the third algorithm is as follows.

In the beginning, one executes a data reception from a base station 12 on communication channel (unit 74). The received data include ephemerises, numbers of visible satellites and location co-ordinates with accuracy not worse than 150 km (it is desirable, as discussed above, that the accuracy be no worse than 25 to 30 km, so that the error of determination of Doppler shift is no worse than 30 Hz). Also, the derivation of frequency of the reference generator of the former 4 from a nominal value is fixed, that is determined by its shift in relation to a high-stability reference signal received on communication channel from a base station 12 (units 75). In the alternative, when the tuning of frequency of the reference generator is implemented pursuant to frequency of the external high-stability signal, value of the said deviation is taken as zero.

The installation of channels 14 of digital correlator 13 based on calculated data about value of carrier frequencies of satellites (unit 76) is executed, i.e. installation of digital controlled generators 20 of the carrier frequency, then set-up of elements of channels 14 of digital correlator 13, determining range, on the first temporal position (unit 77). All K=20 to 40 of quadrature correlators $27_1$–$27_K$ and $28_1$–$28_K$ are placed with a step of ½ digits of C/A code, thus overlapping an interval of 10 to 20 digits (all of digits in a period of C/A code, which is 1023).

Collecting calculated values is executed in a RAM 19—simple memorizing on an interval of 1 sec. (unit 78), then—evaluation of modules or their squares for each correlator of each channel 14 for different positions of prospective margins of digits of the information (unit 79) takes place. It is required because of absence of the data on precise time, and ephemerises are not enough for delimitation of digits, and, if they are unknown, it is impossible to execute coherent accumulation of samples on an interval I=4 to 20 msec.

Evaluation of modules is executed in conformity with expression:

$$\rho_{ji}^2 = \sum_{1}^{M_i 1} \left[ \left( \sum_{1}^{I} I_i \right)_j^2 + \left( \sum_{1}^{I} Q_i \right)_j^2 \right] \quad (2)$$

Where:
i=number of calculated values, i=1–1000;
j—assumed position of margin of digits of the information, j=0–19 MC;
I—duration of an interval of coherent processing of a signal, I=4 to 20 msec.

Further takes place the finding of two global maxima of modules in each channel 14 of digital correlators 13—i.e. on each satellite—(unit 80), then their comparison with a threshold is executed for fixing of detection (unit 81). If the signal is not detected, one executes shift of C/A codes in generators 23 of channels 14 by 10 to 20 digits (unit 82) and the entire cycle of operations (units 78–81) is repeated.

After finding and fixing of said maxima for all satellites (unit 83) one executes interpolation of peak of a correlation and calculation of pseudo-range (unit 84), solution of a navigational task (unit 85) and transmission of coordinates to the base station 12 (unit 86).

Thus, the receiver according to the present invention operates under different conditions of a signal reception GPS, including in conditions of blockage. It allows to execute transmission of alarm signals (in case of originating extreme situations) with a locating information even in a case, when the signal to noise ratio of received GPS signals lies below standard threshold value. This allows to use the receiver according to the present invention for operations "under foliage", in conditions of tilting, etc.

From the above it is evident, that the claimed invention is feasible, industrially applicable and solves the problem of creation of the receiver of GPS signals for a system of personal safety distinguished, in comparison with the receiver—prototype, by the ease of realization, lower power consumption, smaller overall dimensions and weight, lower cost (due to exclusion of functional units 7–9 of the prototype, which are power consuming), that is especially important for a mass consumer. Thus, the fulfillmnent by the receiver according to the present invention of all necessary functions related to a position-fix of the receiver is provided including the operational capability of working in conditions of blockage of a signal GPS, when its power is 15 to 20 db less than nominal power 164.5 db·W, which allows to realize the main feature of the receiver as the receiver of GPS signals for a system of personal safety.

The achieved essential simplification and cost reduction of the receiver with preservation of all functions makes it feasible for use in communication systems developed for securing personal safety of people.

What is claimed is:

1. A portable GPS-receiver for a system of personal safety comprising:

sequentially connected input and output units;

a data input-output unit; and a transceiver unit for a reception and a transmission of data through a communication channel, wherein the communication channel links the portable GPS receiver with a base station, an output of a reference signal of the transceiver unit is connected to a reference input of the input unit, a clock input of the output unit is connected to a clock output of the input unit, the input unit comprises:

a radio frequency signal converter, whose signal input is a signal input of the input unit;

an analog-to-digital conversion of signals unit, whose output is a signal output of the input unit, wherein the radio frequency converter and the analog-to-digital conversion of signals unit are sequentially connected; and a former of signals of clock and heterodyne frequencies, wherein a reference input of the former is a reference input of the input unit, a heterodyne output of the former is connected to a heterodyne input of the radio frequency signal converter, and a clock output of the former, being a clock output of the input unit, is connected to a clock input of the unit of analog-to-digital conversion of signals, the output unit further comprising:

a multichannel digital correlator with N=8 to 12 channels of parallel processing;

a microprocessor connected with the multichanel digital correlator, the microprocessor comprising: a constant storage for storage of programs of signal processing; and an operative storage for storage of data used by the portable GPS-receiver when operating in a standard mode without blockage of GPS signals;

an additional constant storage; and an additional operative storage, wherein the microprocessor is connected by data buses to:

the former of the signals of clock and heterodyne frequencies, to the data input-output unit, the transceiver unit, the additional permanent storage for storage of the programs of signal processing, and the additional operative storage for storage of data and calculated values of the multichannel digital correlator used by the portable GPS receiver when operating in conditions of blockage of GPS signals, and wherein each of the N channels of the multichannel digital correlator comprises K inphase and K quadrature correlators, where K=20 to 40, connected with corresponding ones of the permanent and operative storage units, thereby ensuring simultaneous correlation of GPS signals with K copies of a C/A code of GPS, shifted by one half of a digit of the C/A code of GPS, and coherent accumulation of results of a correlation on an interval equal to a duration of an epoch of C/A code.

2. The receiver as in claim 1, wherein each of the N channels of the multichannel digital correlator comprises:

a digital controlled generator of a carrier frequency;

a control register;

a digital controlled code generator;

a generator of a reference C/A code of GPS;

a programmed delay line;

first and second digital mixers of inphase and quadrature channels of processing, respectively;

first and second groups of K inphase and K quadrature correlators, wherein first inputs of the correlators are connected to outputs of corresponding digital mixers, second inputs of the correlators are connected to corresponding outputs of a programmed delay line, and outputs of the correlators are connected to signal inputs of the corresponding ones of the storage units; and a data exchange unit which links outputs of the corresponding ones of the storage units, control input of the digital controlled generator of a carrier frequency, control input of the control register, control input of the digital controlled code generator and first input of the generator of the reference C/A code with the microprocessor of the output unit, wherein linked with each other, signal inputs of the first and second digital mixers form a signal input of each of the N channel, linked with each other, clock inputs of the digital controlled generator of the carrier frequency, digital controlled code generator, the programmed delay line and the storage units form a clock input of each of the N channel, the second inputs of the first and second digital mixers are connected respectively to the first and second outputs of the digital controlled generator of the carrier frequency, signal and control inputs of the programmed delay line are connected respectively to an output of the generator of the reference C/A code of GPS and to the first output of the control register, the second output of the control register is connected to the second input of the generator of the reference C/A code of GPS, and a third input of the generator of the reference C/A code of the GPS is connected to an output of the digital controlled code generator, thereby in the multichannel digital correlator, linked with each other signal inputs of the N channels and linked with each other clock inputs of the N channels form respectively signal and clock inputs of the multichannel digital correlator.

* * * * *